US006614902B1

United States Patent
Rizzetto

(10) Patent No.: US 6,614,902 B1
(45) Date of Patent: Sep. 2, 2003

(54) CALL-CENTER CALL ROUTING

(75) Inventor: Daniele Rizzetto, Bristol (GB)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/434,914

(22) Filed: Nov. 5, 1999

(51) Int. Cl.7 .............................................. H04M 3/00
(52) U.S. Cl. ........................ 379/265.11; 379/220.01; 370/400; 370/401; 370/352
(58) Field of Search ................. 370/352, 365, 370/389, 265, 224; 434/118; 379/221, 220, 112, 265.11, 230; 709/206

(56) References Cited

U.S. PATENT DOCUMENTS

| 4,737,983 A |   | 4/1988  | Frauenthal et al. ......... 379/221 |
|-------------|---|---------|-------------------------------------|
| 5,291,250 A |   | 3/1994  | Nishikawa et al. ......... 355/256 |
| 5,291,550 A |   | 3/1994  | Levy et al. .................. 379/242 |
| 5,335,268 A |   | 8/1994  | Kelly, Jr. et al. ............ 379/112 |
| 5,450,482 A | * | 9/1995  | Chen et al. .................. 370/352 |
| 5,452,350 A |   | 9/1995  | Reynolds et al. ............ 379/220 |
| 5,469,504 A | * | 11/1995 | Blaha .......................... 434/118 |
| 5,546,452 A |   | 8/1996  | Andrews et al. ............. 379/219 |
| 5,765,033 A |   | 6/1998  | Miloslavsky ............ 395/200.36 |
| 5,848,143 A |   | 12/1998 | Andrews et al. ............. 379/219 |
| 5,878,130 A |   | 3/1999  | Andrews et al. ............. 379/265 |
| 6,061,347 A | * | 5/2000  | Hollatz ........................ 370/352 |
| 6,064,667 A | * | 5/2000  | Gisby et al. ................. 370/356 |
| 6,196,846 B1| * | 3/2001  | Berger et al. ................ 434/118 |
| 6,337,858 B1| * | 1/2002  | Petty et al. .................. 370/356 |

FOREIGN PATENT DOCUMENTS

| WO | WO 96/27254 | 9/1996 |
|----|-------------|--------|
| WO | WO 97/22210 | 6/1997 |

* cited by examiner

Primary Examiner—Ahmad F. Matar
Assistant Examiner—Karen Le

(57) ABSTRACT

A call center has a number of workgroups each with a routing controller for determining the most suitable destination within the workgroup for receiving a call. This determination is done on the basis of a routing table periodically generated for the workgroup by the routing controller. The workgroups exchange their routing tables. The routing controller of every workgroup thus has sufficient information to globally determine the most suitable workgroup to handle an incoming call. This redundancy avoids the need to provide a fault tolerant central controller.

14 Claims, 3 Drawing Sheets

CALL-CENTER CALL ROUTING

FIELD OF THE INVENTION

The present invention relates to call routing in relation to call centers logically composed of a number of workgroups. In particular, but not exclusively, the present invention relates to call routing in relation to call centers capable of handling both traditional telephone calls and VoIP ("Voice over IP") calls.

BACKGROUND OF THE INVENTION

The selective routing of incoming calls through the public telephone network to the most appropriate workgroup of a call center and then to the most appropriate agent in the selected workgroup is a key activity in ensuring the efficient operation of a call center. A number of solutions have been proposed in the past, notable amongst which are those disclosed in the following US patents:

U.S. Pat. No. 4,737,983—describes a method of balancing traffic loads to a plurality of ACDs in which "call congestion data" is fedback from ACDs to an update processor that controls the updating of a routing table to cause the latter to reflect the desired % of calls to go to each ACD. The routing table is used by a service control function of the PSTN to route calls to the appropriate ACD.

U.S. Pat. No. 5,452,350—describes a system in which the service control function of a PSTN queries a routing processor of the subscriber (e.g. call center) network to be told the number to which a call should be routed to access a particular resource. Routing is done on the basis of call identification information and capacity percentages (% of calls to go to particular resources).

U.S. Pat. No. 5,335,268—describes a system in which routing is done on the basis of network usage, ACD availability, and route costing data.

U.S. Pat. No. 5,291,550—describes a system in which the call center operator defines the routing policy to ACDs and periodically uploads it to a dynamic network call distributor. Routing is dependent on call class (indicated by elements in dialed number) as well as traffic load and routing parameters.

U.S. Pat. No. 5,546,452—describes a system in which a central controller generates control signals for controlling both the telephone network and the caller resource (ACDs) so as to optimally route the call.

Whilst the foregoing prior art disclosures only concern the routing of voice calls through the telephone infrastructure, it is also known to effect routing control for other call types such as voice calls passing as packet data over a data network, or text-based calls such as e-mails. Thus, U.S. Pat. No. 5,765,033 describes a system in which information is extracted from e-mail received at a call center and is used to select an agent with appropriate skill to which the email should be routed (this system concerns internal routing in a call center rather than routing to the call center itself). U.S. Pat. No. 5,848,143 and U.S. Pat. No. 5,878,130 both describe the use of a central routing controller for routing Internet calls as well as normal PSTN calls.

An important consideration in implementing a call routing control system is how to provide fault tolerance to avoid system collapse should part of the routing control means fail for whatever reason. The usual approach adopted is to provide duplicate routing controllers connected in parallel to the other system components; one such arrangement is described in the afore-mentioned U.S. Pat. No. 5,848,143. However, the current systems do not provide easy scalability and are generally expensive to implement.

It is an object for the present invention to provide an improved call routing system and method which inherently provides fault tolerance capability and facilitates load spreading.

SUMMARY OF THE INVENTION

According to one aspect of the present invention, there is provided a call center system with multiple workgroups, each workgroup having a routing controller comprising:

routing-data generating means operative to derive workgroup routing data indicative of the suitability of destinations within the workgroup for receiving calls;

transfer means for passing the workgroup routing data directly or indirectly to the routing controllers of the other workgroups;

storage means for storing the workgroup routing data of all operative workgroups, and global routing means for receiving a routing request in respect of a call incoming to the call center, determining from the stored routing data for all operative workgroups which workgroup is most suited to handle a call, and responding to the routing request accordingly.

According to another aspect of the present invention, there is provided a method of controlling the routing of calls to a call center system with multiple workgroups, the method involving carrying out the following operations separately for each workgroup:

generating, for the workgroup concerned, workgroup routing data indicative of the suitability of destinations within the workgroup for receiving calls;

exporting the workgroup routing data for the workgroup concerned;

receiving workgroup routing data exported in respect of the other workgroups and storing the workgroup routing data of all operative workgroups, and receiving a routing request in respect of a call incoming to the call center, determining from the stored routing data for all operative workgroups which workgroup is most suited to handle a call, and responding to the routing request accordingly.

BRIEF DESCRIPTION OF THE DRAWINGS

A call center embodying the invention will now be described, by way of non-limiting example, with reference to the accompanying diagrammatic drawings, in which.

BEST MODE OF CARRYING OUT THE INVENTION

Figure 1:
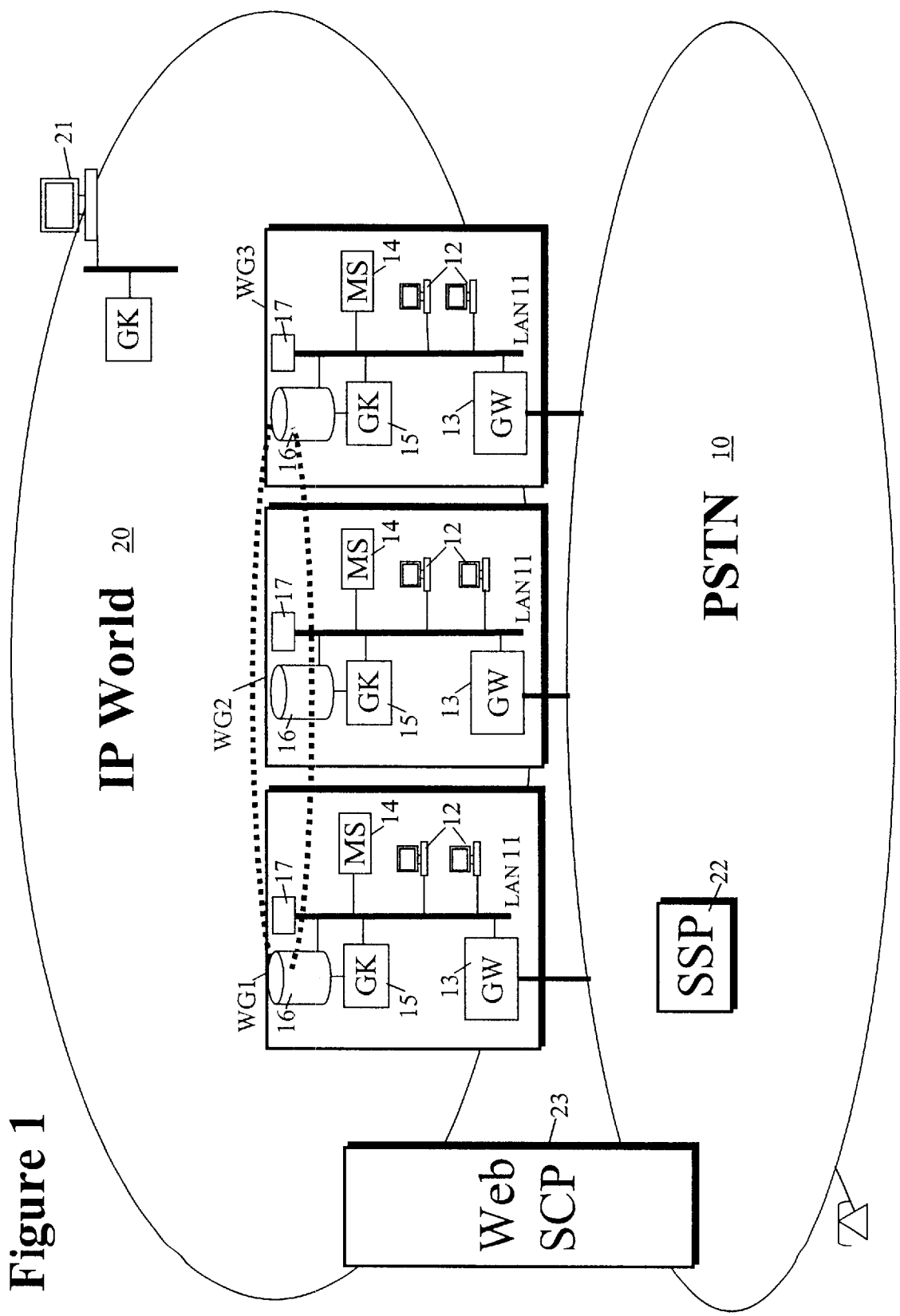
FIG. 1 is a diagram of the call center showing its relation to a PSTN and an IP-based network.

The FIG. 1 call center comprises three logical work groups WG1, WG2, WG3 (generically referred to below as "WG") that may be co-located or geographically dispersed. The call center interfaces both with a traditional telephone network 10, and with an inter-connected network 20 of IP-based networks (this network of networks being hereinafter referred to simply as the "IP network" 20). By way of example, the telephone network 10 is here shown as a PSTN (analog and/or ISDN based), but may equally be a PLMN, a private network, or similar telephone network. The IP network 20 may be the Internet, an intranet, or similar IP-based network.

The PSTN includes as well as normal switches (not shown), a service switching point (SSP) 22 capable of determining that a particular service is required for a call and for sending a service request to the service control subsystem of the PSTN. In the present example, the service control subsystem comprises a "WebSCP" 23, namely a service control point (SCP) with a web interface for retrieving service data and logic over the IP network 20 using the web HTTP protocol . Further details of WebSCP 23 are given in our published International Application WO97/22210 which is incorporated herein by reference. In fact, any SCP with an interface to the IP network 20 may be used for component 23. Whatever the precise form of SCP 23, the SCP will respond to a service request from SSP 22 with a number to be used for routing the call in respect of which the service request was made. As will be explained hereinafter, in the present case the SCP23 determines its response in dependence on data it receives back from a query sent out over the IP network 20.

Each workgroup WG comprises a LAN 11 to which are connected a plurality of agent workstations 12, a media gateway 13, a media server 14, a gatekeeper 15 with an associated web server 16, and a router 17. Each workgroup WG connects via its gateway 13 to the PSTN 10, and via its router 17 to the IP network 20 of which it substantially forms a part.

Each workgroup can thus receive calls from both the PSTN and from terminals 21 (such as a PC) linked to the IP network 20. Calls from the PSTN are received at the gateway 13 and are converted into a VoIP call for routing to a selected agent workstation 12 over LAN 10. VoIP calls from terminals 21 are received at the router 17.

By way of example, the VoIP calls will be taken to be in accordance with the H.323 standard though other VoIP standards can alternatively be used.

Each agent workstation 12 is capable of handling VoIP calls and, in addition, can receive caller data for screen display to the agent. This caller data can be derived from any appropriate source such as a caller database (not shown) holding known information about a caller, or from an information-collecting resource arranged to gather caller data as an initial phase of a current call (for example, using the media server or a related website interaction with the caller).

Calls received at a workgroup WG may instead of being routed to an agent workstation, be routed to the media server for delivery of voice announcements (more generally for every capability involving data streaming) and/or the collection of user input.

Although each workgroup WG has been described as being composed of elements all connecting with the same LAN 10, it would be possible to remotely locate elements. For example, one or more agent workstations may reside at a remote location on a different LAN or at the end of an ISDN link. The physical location of the components is not itself of importance, but it is necessary for the gatekeeper 15 to know (or be able to determine) the IP address of the components of the same workgroup WG.

Consideration will next be given as to how call control is effected for the call center. At a basic level, control of the VoIP calls in the IP network 20 (whether PSTN originating or terminal-originating) is effected in known manner by gatekeepers (eg gatekeepers 15) that exchange control messages (for example in accordance with the Inter-GateKeeper protocol of the H.323 standard). Thus, the gatekeeper 15 of a workgroup WG will know the IP addresses of the associated agent workstations 12 and can return the IP address of an available agent workstation in response to a request as to where to route an incoming call.

At a higher level, the gatekeeper 15 of a workgroup WG also performs a workgroup-level control function by determining priorities between its agent resources. More particularly, the gatekeeper 15 keeps track of the availability of agents at the agent workstations ("availability" being dependent on factors ranging from simple presence, to length of call-waiting queue). Additionally, the gatekeeper 15 will store policies and data relating to agent skill level and time-of day routing. Based on all these factors (and potentially further factors), the gatekeeper 15 will construct a routing table, in a manner well understood by persons skilled in the art, which it stores. This routing table is then used by the gatekeeper to determine to which workstation 12 to allocate a call (the call may not be immediately be routed to that workstation but may need to be queued and/or connected to the media server 14 as a preliminary step). The gatekeeper 15 updates its routing table at frequent intervals (or whenever a relevant parameter changes).

In the present call center, the gatekeepers 15 of all the workgroups WG are arranged to exchange their routing tables at frequent intervals, each gatekeeper 15 storing the routing tables for all workgroups WG. The exchange of routing tables (indicated by a dotted ellipse in FIG. 1) can be effected either using IGCP (in which case the gatekeepers themselves effect the exchange) or using HTTP (in which case it is the web servers 16 associated with each gatekeeper 15 that effect the exchange). Any distribution topology may be used for the exchange (ring, fully meshed, etc.).

Since each gatekeeper 15 now has access to the routing tables for all workgroups, each gatekeeper can make global routing decisions between the workgroups, that is, decide which workgroup is best suited to handle any particular call. The algorithm used to determine which workgroup is best suited should be the same for each gatekeeper to ensure consistency of decision between them; how such an algorithm may make its selection is well understood by persons skilled in the art and will therefore not be detailed.

Having described the basic structure and control functions of the call center, two examples of its operation will now be given.

Figure 2:
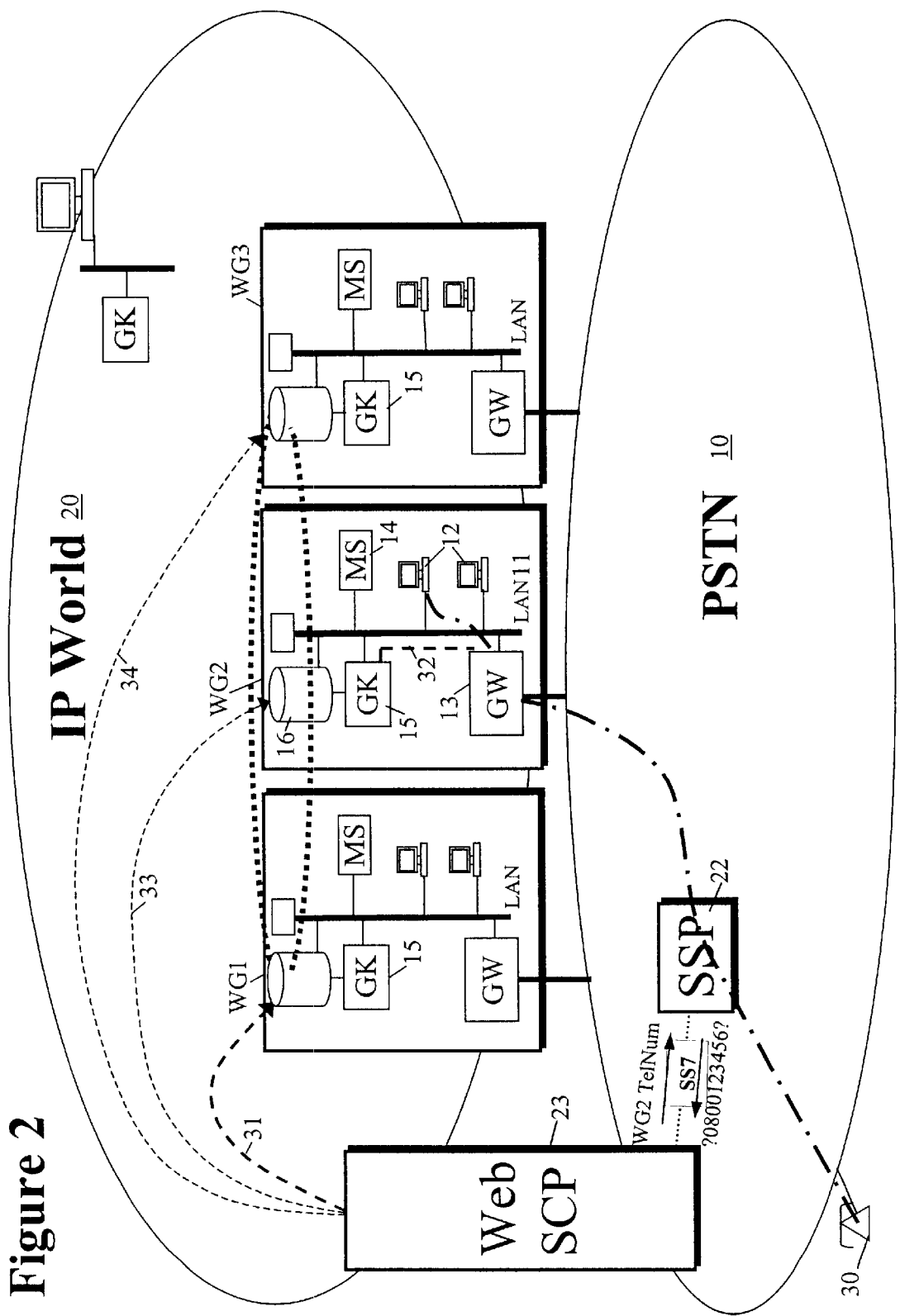
FIG. 2 is a diagram similar to FIG. 1 showing message paths and call routing during connection of a PSTN-originating call to a call-center agent.

FIG. 2 illustrates how a call from a PSTN phone 30 is handled. The caller calls a number N (here given as "0800 123456") that indicates to the SSP 22 that the caller wishes to place call (in this example, a free-phone call) to the call center. The number N may already designate a particular workgroup or it may simply designate the call center as a whole. The SSP 22 makes a service request to the SCP 23 which, in turn, makes a request to one of the HTTP servers 16 of the call-center workgroups asking for the telephone number to which the call should be routed. The server 16 contacted may be dependent on the number N or may chosen according to some predetermined ordering (for example, on a round robin principle). In the present case, it is the server 16 of workgroup WG1 that is contacted (see thick dashed line 31 in FIG. 2). On receiving the request, the server 16 passes it to its gatekeeper 15 which then determines from the routing tables available to it, which workgroup WG is best suited to handle the call (in this example, workgroup WG2). The telephone number of this workgroup is then returned by the server 16 to the SCP 23 which, in turn, passes it back to the SSP 22. SSP 22 then routes the call from phone 30 to the gateway 13 of workgroup WG2 at the number passed back to the SSP 22 from the gatekeeper 15 of workgroup WG1.

The gateway 13 then asks the gatekeeper 15 of workgroup WG2 where it should route the call i.e. to which agent workstation 12 or media server 14 (see dashed line 32). The gatekeeper 15 responds appropriately and the gateway 13 then passes the call as a VoIP call over the LAN 11 to the designated agent workstation/media server.

The route of the call from phone 30 to the agent workstation is indicated by a chain-dashed line in FIG. 2.

If during this call set up process, SCP 23 had been unable to obtain a response from the server 16 of workgroup WG1, then it will try contacting the server 16 of a different workgroup according to a default schedule held by the SCP. If the second choice server also fails to respond, the SCP may try a third server 16. This fallback messaging is indicated by light dashed lines 33, 34 in FIG. 2.

This fault tolerant behaviour of the call center is made possible by the fact that the routing tables for all the workgroups are available at each workgroup whereby global routing decisions can be made by any of the gatekeepers 15.

Figure 3:
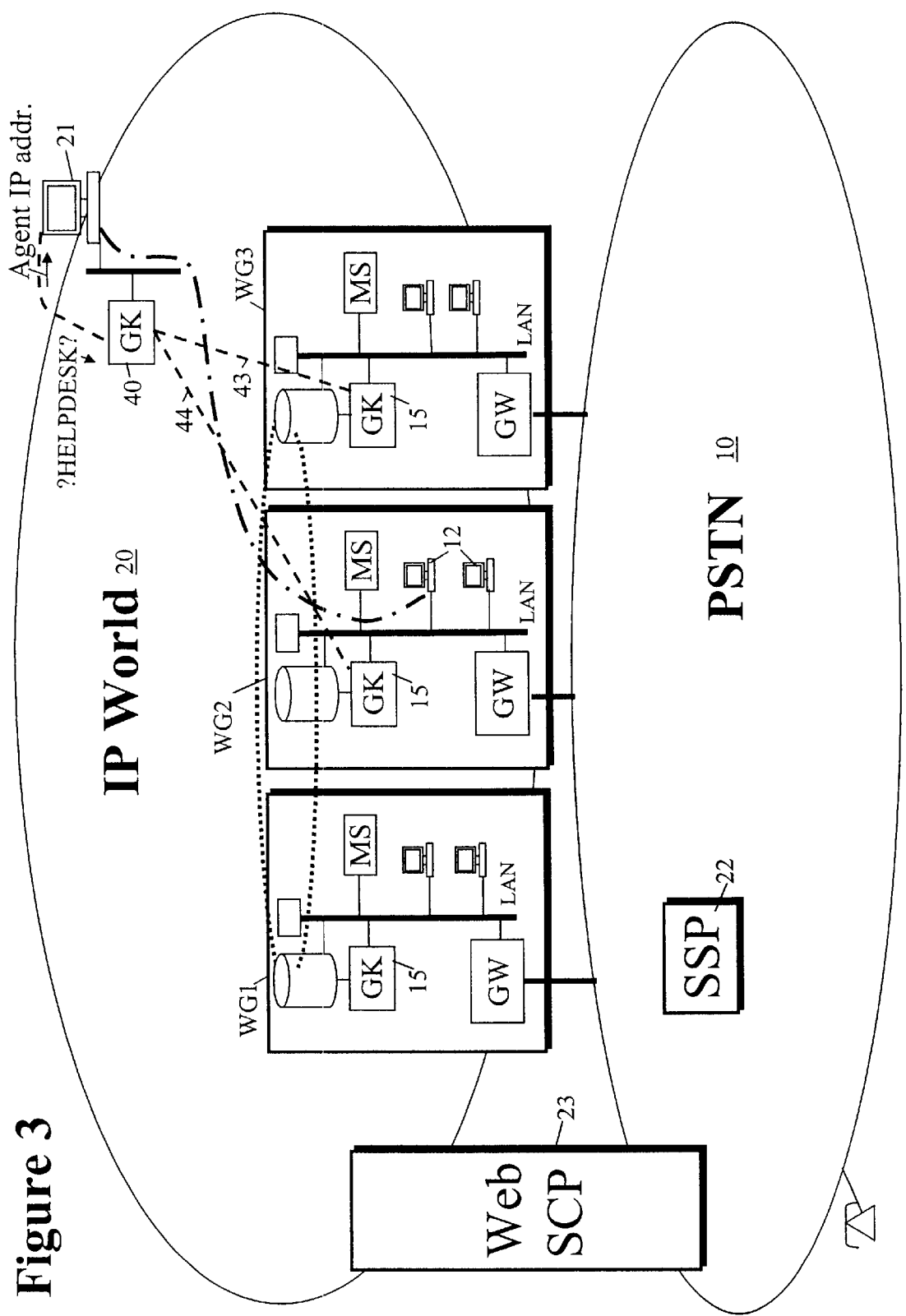
FIG. 3 is a diagram similar to FIG. 1 showing message paths and call routing during connection of a network-originating VoIP call to a call-center agent.

FIG. 3 shows the handling of a call placed from terminal as a VoIP call (for example a "Help Desk" call). In this case, the gatekeeper 40 of the LAN on which the terminal 21 is situated contacts a gatekeeper 15 of one of the workgroups—in this case workgroup WG3 (see dashed line 43). The gatekeeper of workgroup WG3 determines from all the workgroup routing tables available to it that the call should be handled by workgroup WG2 and informs the gatekeeper 40 accordingly. Gatekeeper 40 then contacts the gatekeeper 15 of workgroup WG2 (see dashed line 44) asking it for the IP address of the agent/media server to which the VoIP call should be routed. Gatekeeper 15 returns the IP address of a particular agent workstation 12 in workgroup WG2 and gatekeeper 40 passes this information back to terminal 21. Terminal 21 then establishes a VoIP call to the appropriate agent workstation (see chain-dashed line).

It will be appreciated that if the most suitable workgroup was the one first contacted (workgroup WG3 in the present example), the gatekeeper of that workgroup will directly respond with the IP address of the agent (or other resource) to be contacted. Indeed, since the first contacted gatekeeper 15 has available to it the routing table for the workgroup determined by it to be the most suitable, it can in theory directly determine and return the IP address of the agent/ resource to receive the call (assuming it had been passed these addresses). However, this is not consistent with the intended operation of the gatekeepers which are generally in charge of routing VoIP calls within their related domains. Furthermore, it is not necessarily the best strategy to adopt since although the routing tables will be reasonably current, they may not have the very latest information concerning agent situation in every workgroup and it will generally be better to leave final workgroup-internal routing up to the gatekeeper of the workgroup selected.

With respect to how the gatekeeper 40 determines which gatekeeper 15 to contact initially, a number of possibilities exist. Thus, gatekeeper 40 could have previously registered with the call center to be informed of the IP addresses of the gatekeepers 15; the gatekeeper 15, knowing the addresses of the gatekeepers 15 could then either select one according to a predetermined policy or broadcast to all gatekeepers 15 (in which case, gatekeeper 40 would then utilise only the first response only).

As with calls placed from the PSTN, calls placed form a terminal 21 benefit from the routing information redundancy inherent in the call center whereby should the contacted gatekeeper 15 be down, the other gatekeepers 15 can be contacted to give the same global routing decision.

Various modifications are, of course, possible to the arrangement described above. For example, the SCP 23 rather than talking to the workgroups WG using HTTP, could talk IGCP directly to the gatekeepers 15 thereby avoiding the need for the servers 16. Furthermore, rather than the full routing table of each workgroup being passed to the other workgroups, a subset of the full routing table could be passed giving sufficient information to enable the most suitable workgroup to be selected according to the selection algorithm in use.

The network 10, rather than being a telephone network, could, in fact, be any switched telecommunications network. The network 20 may also be a non IP-based packet network. Furthermore, at least one of the workgroups could be arranged to handle non-voice calls, such as text-based calls (for example, e-mails or web-based forms) or video calls.

What is claimed is:

1. A call center system with multiple workgroups, each workgroup having a routing controller comprising:
    routing-data generating means operative to derive workgroup routing data indicative of the suitability of destinations within the workgroup for receiving calls;
    transfer means for passing the workgroup routing data directly or indirectly to the routing controllers of the other workgroups and for receiving from each such routing controller the workgroup routing data generated by the routing-data generating means of that controller;
    storage means for storing both the workgroup routing data generated by the routing-data generating means of the same controller, and the workgroup routing data received by the transfer means from the routing controllers of all other operative workgroups, and
    global routing means comprising:
        receiving means for receiving a routing request in respect of a call incoming to the call center before the call is routed to a workgroup,
        selection means for determining from the stored routing data for all operative workgroups, including the workgroup with which the routing controller is associated, which workgroup is most suited to handle the call, and
        response means for responding to the routing request according to the determination made by the selection means,
    the selection means of all routing controllers making their determinations on the same basis such that the workgroup selected as most suited to handle a call is the same regardless of which routing controller receives the routing request.

2. A call center system according to claim 1, wherein at least one of the workgroups is adapted to receive voice calls from the public telephone network and at least one of the workgroups is adapted to receive voice calls from a data network.

3. A call center system according to claim 1, wherein at least one workgroup is adapted to receive voice calls both from a telephone network, and from a data network.

4. A call center system according to claim 2, wherein said voice calls received from the data network are Voice over IP calls.

5. A call center according to claim 1, wherein at least one of the workgroups is adapted to receive calls in the form of text-based messages.

6. A call center according to claim 1, wherein the workgroup further comprises:
   a LAN to which said routing controller is connected,
   a first interface for interfacing with a data network for receiving VoIP calls,
   a second interface for interfacing with a telephone network and for converting calls received therefrom into VoIP calls, and
   agent workstations for handling calls,
said routing request being received through said first interface.

7. A method of controlling the routing of calls to a call center system with multiple workgroups, the method involving carrying out the following operations separately for each workgroup:
   generating, for the workgroup concerned, workgroup routing data indicative of the suitability of destinations within the workgroup for receiving calls;
   exporting the workgroup routing data for the workgroup concerned; and
   receiving workgroup routing data exported in respect of the other workgroups and storing the workgroup routing data of all operative workgroups;
the method further involving passing to any one of the routing controllers a routing request in respect of a call intended for the call center before the call is passed to a workgroup, the routing controller determining from the stored routing data for all operative workgroups which workgroup is most suited to handle the call, and responding to the routing request accordingly.

8. A call center system according to claim 3, wherein said voice calls received from the data network are Voice over IP calls.

9. A method according to claim 8, wherein all the routing controllers determine the most suitable workgroup on the same basis such that the workgroup selected as most suited to handle a call is the same regardless of which routing controller is passed the routing request.

10. An arrangement for routing calls to a call center system with multiple workgroups, the arrangement comprising a respective routing controller for each workgroup and call-routing apparatus, separate from the routing controllers, for routing a call intended for the call center to a said workgroup; each routing controller comprising:
   a routing-data generating device operative to derive workgroup routing data indicative of the suitability of destinations within the workgroup for receiving calls;
   a transfer device for exchanging workgroup routing data with the routing controllers of all the other workgroups;
   a storage device for storing the workgroup routing data of all operative workgroups, and
   a global routing device for receiving a routing request in respect of a call yet to be routed to a workgroup, determining from the stored routing data for all operative workgroups which workgroup is most suited to handle a call, and responding to the routing request accordingly.

11. An arrangement according to claim 10, wherein all routing controllers are arranged to determine the most suitable workgroup on the same basis such that the workgroup selected as most suited to handle a call is the same regardless of which routing controller handles the routing request.

12. An arrangement according to claim 11, wherein the call-routing apparatus is so arranged that upon receiving a call intended for the call center system, it causes said routing request to be generated and sent to one said routing controller, the call-routing apparatus being further arranged such that, upon receipt of a response from the global routing device of the controller, it routes the call to the workgroup most suited to handle the call.

13. An arrangement according to claim 10, further comprising a control entity for generating said routing request, the control entity being arranged to send the routing request to one said routing controller, and being further arranged in default of receiving a response from said one routing controller, to re-send said routing request to another of said routing controllers.

14. An arrangement according to claim 10, wherein the routing controllers are so arranged that when a routing controller handling a routing request determines that the most suitable workgroup is the one with which it is associated, it causes a final destination address to be returned in response to the routing request, the call-routing apparatus being operative to use this address to effect call routing.

* * * * *

UNITED STATES PATENT AND TRADEMARK OFFICE
CERTIFICATE OF CORRECTION

PATENT NO. : 6,614,902 B1
DATED : March 7, 2005
INVENTOR(S) : Daniele Rizzetto

It is certified that error appears in the above-identified patent and that said Letters Patent is hereby corrected as shown below:

<u>Column 8,</u>
Line 24, change "claim 11" to -- claim 10 --.

Signed and Sealed this

Third Day of May, 2005

JON W. DUDAS
*Director of the United States Patent and Trademark Office*